(12) United States Patent
Chao et al.

(10) Patent No.: US 12,533,243 B2
(45) Date of Patent: Jan. 27, 2026

(54) INTERVERTEBRAL FUSION DEVICE

(71) Applicant: BioLife Medical Device Inc., HsinChu (TW)

(72) Inventors: Che-Yang Chao, Hsinchu (TW); Chao-Jan Wang, Hsinchu (TW); Li-Sen Chen, Hsinchu (TW); Wei-Tai Jao, Hsinchu (TW)

(73) Assignee: BioLife Medical Device Inc., Hsinchu (TW)

( * ) Notice: Subject to any disclaimer, the term of this patent is extended or adjusted under 35 U.S.C. 154(b) by 0 days.

(21) Appl. No.: 19/097,857

(22) Filed: Apr. 2, 2025

(65) Prior Publication Data

US 2025/0312169 A1    Oct. 9, 2025

(30) Foreign Application Priority Data

Apr. 3, 2024  (TW) .................................. 113112701

(51) Int. Cl.
*A61F 2/44*  (2006.01)
*A61F 2/46*  (2006.01)
*A61F 2/30*  (2006.01)

(52) U.S. Cl.
CPC ............ *A61F 2/446* (2013.01); *A61F 2/4611* (2013.01); *A61F 2002/305* (2013.01)

(58) Field of Classification Search
CPC ....................................................... A61F 2/446
See application file for complete search history.

(56) References Cited

U.S. PATENT DOCUMENTS

| 6,102,950 A * | 8/2000 | Vaccaro | A61F 2/4637 606/247 |
| 6,179,873 B1 * | 1/2001 | Zientek | A61F 2/4657 623/17.11 |
| 2003/0065396 A1 * | 4/2003 | Michelson | A61F 2/447 623/17.11 |

* cited by examiner

*Primary Examiner* — Andrew Yang
(74) *Attorney, Agent, or Firm* — Tung & Associates

(57) ABSTRACT

An intervertebral fusion device configured to maintain a clearance between two vertebrae. The intervertebral fusion device including: a main body, including two vertebral abutting surfaces opposite to each other, an accommodation groove and a slide rail which are both located between the two vertebral abutting surfaces; an positioning hook, disposed in the accommodation groove, the positioning hook including a fixed portion and an expansion arm connected to the fixed portion, wherein the fixed portion is connected to the main body, and the outer side of the expansion arm is provided with a plurality of gripping teeth; and a sliding block, slidably disposed in the slide rail, to maintain a closed state or an expansion state of the positioning hook.

14 Claims, 4 Drawing Sheets

INTERVERTEBRAL FUSION DEVICE

CROSS REFERENCE

The present invention claims priority to TW 113112701 filed on Apr. 3, 2024.

BACKGROUND OF THE INVENTION

Field of Invention

The present invention relates to an intervertebral fusion device, and in particular to an intervertebral fusion device which, by means of gripping teeth provided on its expansion arm, is configured to maintain a clearance between two vertebrae.

Description of Related Art

In the human spine, various factors—such as improper posture, pathological changes, degenerative atrophy, herniated intervertebral disc, and other serious injuries—can cause a change in the intervertebral space, thereby compressing the facet joints and the intervertebral neural foramina. Maintaining the intervertebral spacing is critical for preventing nerve compression adjacent to the vertebrae and avoiding bone damage.

Conventionally, the treatment method involves surgical procedures in which pedicle screws and rods are implanted to distract the intervertebral space. However, this method may result in excessive localized load on the vertebrae, and a filler material is still required to maintain the intervertebral gap. Moreover, the surgical procedure is complex, involving numerous steps, complex instrumentation, and prolonged anesthesia, which increases surgical risks. Therefore, an intervertebral fusion technique that simplifies the surgical process, reduces the number of instruments used, and shortens the surgical duration is highly desirable.

SUMMARY OF THE INVENTION

From one perspective, the present invention provides an intervertebral fusion device for maintaining a clearance between two vertebrae, wherein auxiliary screw implantation is not required during the vertebral fusion surgery. The intervertebral fusion device comprises: a main body having two vertebral abutting surfaces located on opposite external sides (for example, the upper and lower sides in the figures) and an accommodation groove and a slide rail disposed between the vertebral abutting surfaces; a positioning hook disposed in the accommodation groove, the positioning hook comprising a fixed portion and an expansion arm connected to the fixed portion, the fixed portion being connected to the main body, wherein an outer side of the expansion arm (i.e., the side facing the vertebral abutting surface) is provided with a plurality of gripping teeth; and a sliding block, slidably disposed in the slide rail, to maintain the expansion arm in either a closed state or an expanded state of the positioning hook.

In one embodiment, the positioning hook includes two expansion arms respectively connected to two opposite sides of the fixed portion, wherein the outer side of each expansion arm is provided with the plurality of gripping teeth.

In one embodiment, an inner side of each expansion arm is provided with a snap-lock, and wherein the sliding block includes two positioning points corresponding to the snap-locks, respectively defining the closed state and the expanded state of the expansion arms.

In one embodiment, during vertebral fusion surgery, the tips of the gripping teeth on the expansion arms in the expanded state project beyond the vertebral abutting surfaces and engage with the adjacent sides of the vertebrae. In this embodiment, no auxiliary pedicle screws are implanted in the vertebrae on either side; the intervertebral fusion device thereby achieves a positioning function solely by means of the gripping teeth.

In one embodiment, in the closed state, the gripping teeth on the expansion arms are accommodated within the accommodation groove.

In one embodiment, the slide rail is in communication with the accommodation groove. The slide rail and the accommodation groove, as well as the region of the sliding block outside the positioning hook, define a continuous space. During vertebral fusion surgery, this continuous space may be filled with a bone substitute material to assist in fusing the two vertebrae with the intervertebral fusion device. In one embodiment, after fusion, the vertebrae and the intervertebral fusion device are integrated to form a composite new bone body.

In one embodiment, the two vertebrae are lumbar, thoracic, cervical, or adjacent lumbar, thoracic, or cervical vertebrae, and the main body is provided in multiple thicknesses corresponding to various intervertebral clearances.

In one embodiment, the thickness of the intervertebral fusion device (e.g., the thickness of the main body or the overall thickness of the device) is not limited to a single value; rather, different thicknesses of the intervertebral fusion device may be provided corresponding to various intervertebral gap sizes, so as to achieve the purpose of assisting vertebral fusion.

In one embodiment, the main body is fabricated from a polymeric material (e.g., polyetheretherketone (PEEK)), and the positioning hook is fabricated from a metallic material (e.g., titanium or a titanium alloy).

In one embodiment, the plurality of gripping teeth on the expansion arms are configured to engage the inner sides of the vertebrae, thereby securing the intervertebral fusion device between the vertebrae and preventing relative movement or rotation between the device and the vertebrae. The plurality of gripping teeth on the expansion arms may provide at least two engagement points on each vertebra to avoid the formation of a single rotational fulcrum that might cause the intervertebral fusion device to rotate between the vertebrae.

In one embodiment, at least one intervertebral fusion device may be arranged within the intervertebral clearance to enhance the balance and stability of the maintained spacing.

In one embodiment, the sliding block further comprises a guide inclined plane, along which the snap-lock may slide between the two positioning points.

In one embodiment, the fixed portion is connected to the main body by means of a plurality of rods having a snap-lock positioning function.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the components; however, the shown scale, shapes and sizes of the components can be modified in implementation.

Figure 1A:
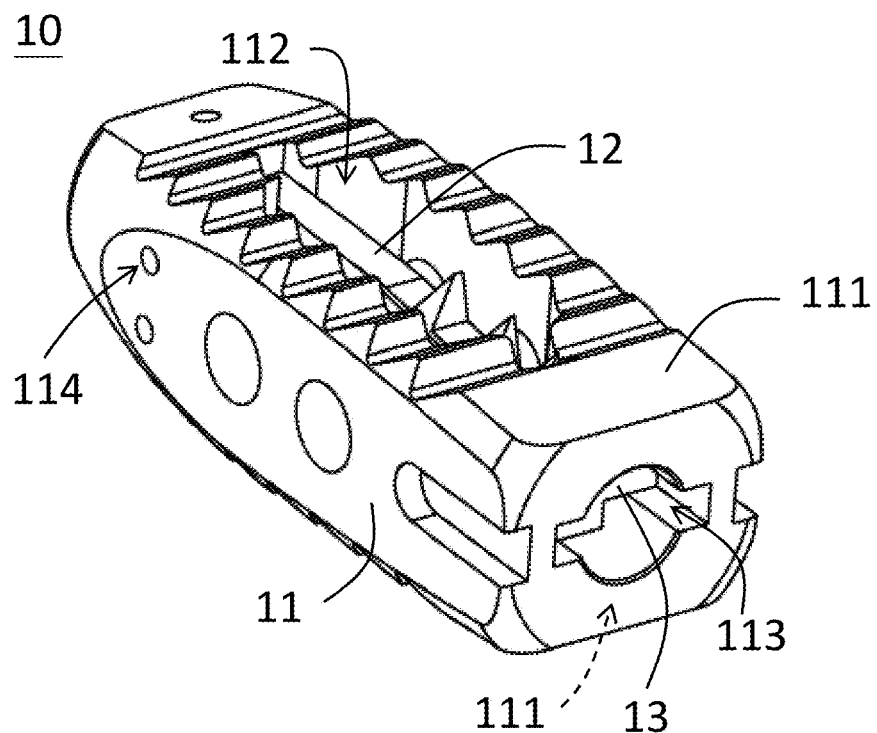
FIGS. 1A, 1B, and 1C are perspective views showing, respectively, an embodiment of the intervertebral fusion device of the present invention, the closed state of the intervertebral fusion device, and a schematic diagram showing the positioning of the intervertebral fusion device.
Figure 1B:
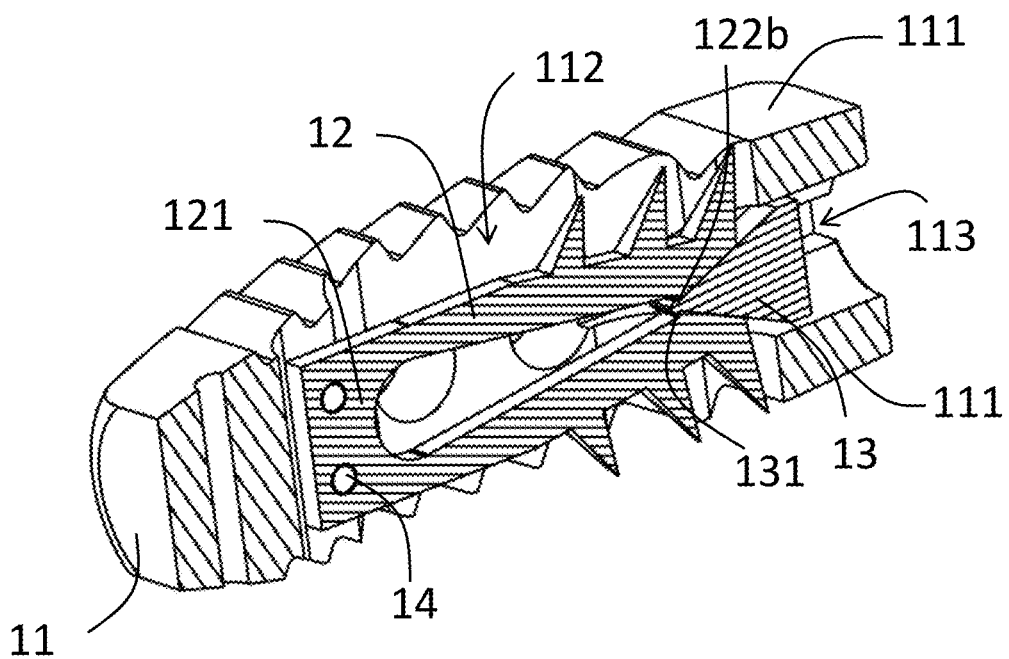
Figure 1C:
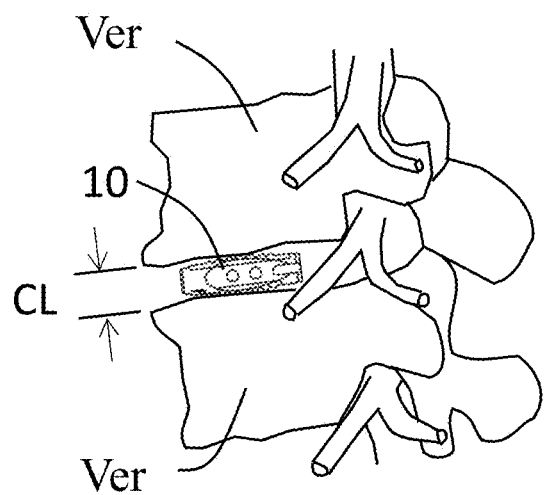
Figure 2:
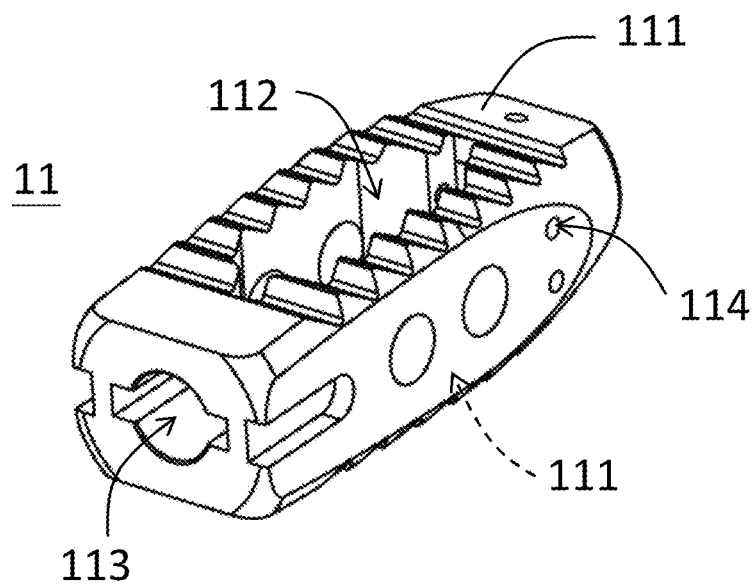
FIG. 2 is a schematic diagram of the main body according to one embodiment of the present invention.
Figure 3:
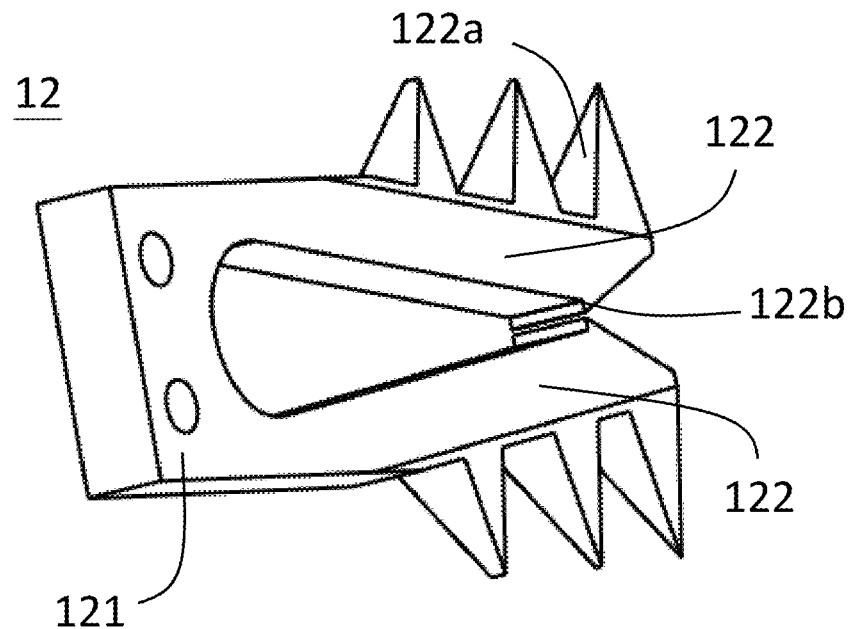
FIG. 3 is a schematic diagram of the positioning hook according to one embodiment of the present invention.

According to one aspect, with reference to FIGS. 1A, 1B, and 1C, the present invention provides an intervertebral fusion device 10 for maintaining a clearance CL between two vertebrae Ver, wherein no auxiliary screws are required during vertebral fusion surgery. In this context, FIG. 1B is a perspective sectional view showing the closed state of the intervertebral fusion device 10 of FIG. 1A, and FIG. 1C is a schematic diagram illustrating the intervertebral fusion device 10 positioned within the clearance CL between two vertebrae Ver. The intervertebral fusion device 10 comprises: a main body 11 having two vertebral abutting surfaces 111 located on opposite external sides of the main body 11 (for example, the upper and lower sides in the figures), and an accommodation groove 112 and a slide rail 113 (refer to FIG. 2) located between the vertebral abutting surfaces 111; a positioning hook 12 (FIG. 3) arranged in the accommodation groove 112, the positioning hook 12 having a fixed portion 121 and two expansion arms 122 connected to both sides of the fixed portion 121 to form a hoof-shaped structure (in the expanded state, one side of the hoof-shaped structure forms an opening, the opening being on the side opposite to the fixed portion 121), the fixed portion 121 being connected to the main body 11, wherein the outer sides of the expansion arms 122 (i.e., the sides in the same direction as the vertebral abutting surfaces 111) are provided with a plurality of gripping teeth 122a, and the inner sides of the expansion arms 122 are provided with a snap-lock 122b (or the inner sides of both expansion arms 122 are provided with a snap-lock 122b); and a sliding block 13 (FIGS. 4A and 4B) slidably disposed in the slide rail 113, the sliding block 13 being provided with two positioning points corresponding to the snap-lock 122b to respectively define a closed state (FIG. 1B) and an expanded state (FIG. 5) of the expansion arms 122. During operation, the expansion arms 122, by means of an inward contraction force (or other means producing inward positioning between the expansion arms 122), maintain the snap-lock 122b engaged with the two positioning points (i.e., the snap-lock 122b maintains a fixed relation with the projection portion 131 of the sliding block 13 and the opposing stop surface 132) so as to maintain the expansion arms 122 in either the closed state or the expanded state. For example, the closed state of the intervertebral fusion device 10 has a reduced overall volume, which is beneficial for packaging and transportation. In another example, in the expanded state of the intervertebral fusion device 10, the gripping teeth 122a on the expansion arms 122 project outward from the vertebral abutting surfaces 111.

In one embodiment, the positioning hook 12 may include one single expansion arm 122 connected to the fixed portion 121, wherein the outer side of the expansion arm 122 is provided with the plural gripping teeth 122a.

It should be noted that the term "hoof-shaped structure" is used herein to describe the structural features of the positioning hook. Specifically, the positioning hook comprises a fixed portion and two expansion arms respectively connected to opposite sides of the fixed portion, forming a shape similar to that of an animal hoof. This structural configuration enables the positioning hook to effectively secure and support the intervertebral fusion device. In animal anatomy, a "hoof" typically refers to the foot structure of animals such as horses or cattle, characterized by a generally U-shaped or C-shaped appearance. This particular shape provides stability and support, making it suitable for bearing an animal's weight and adapting to various terrains. Similarly, in the specification, the described "hoof-shaped structure" utilizes this structural characteristic to achieve a stable and secure fixation. Therefore, the term "hoof-shaped structure" herein emphasizes the functional design of the positioning hook. This design is shaped similarly to an animal hoof to achieve stable and secure fixation.

Figure 5:
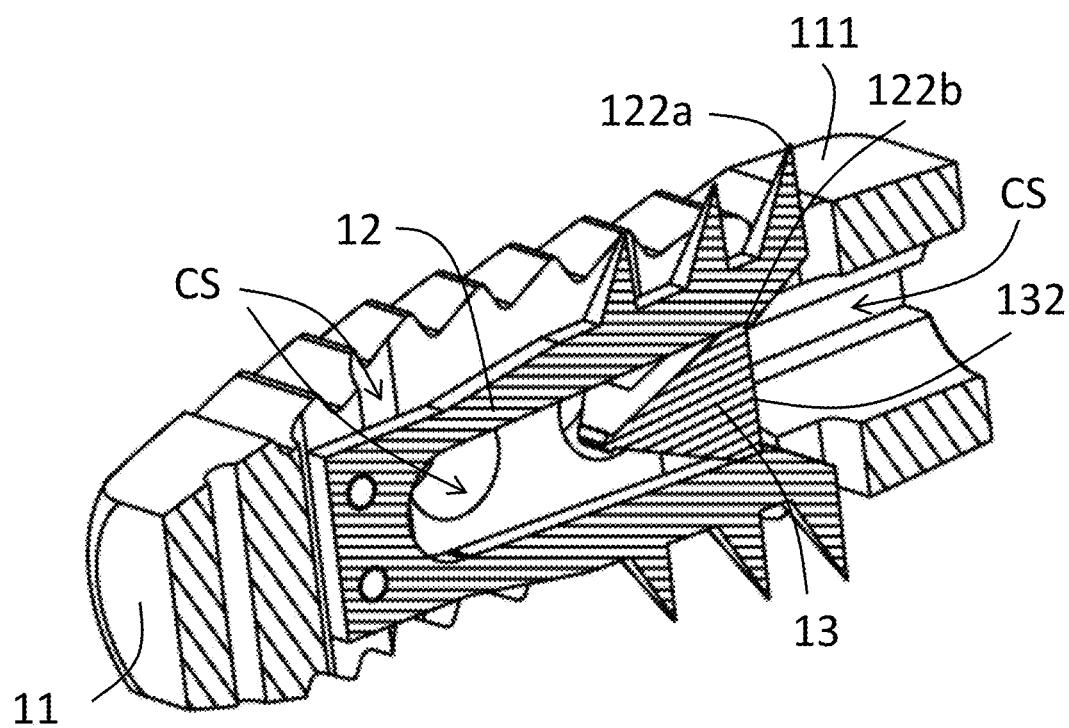
FIG. 5 is a schematic diagram showing the expanded state of the intervertebral fusion device according to one embodiment of the present invention.

With reference to FIGS. 1B and 5, FIG. 1B is a perspective sectional view showing the closed state of the intervertebral fusion device 10 of FIG. 1A, and FIG. 5 is a perspective sectional view showing the expanded state of the intervertebral fusion device 10 in FIG. 1A. During vertebral fusion surgery, in the expanded state, the tips of the gripping teeth 122a on the expansion arms 122 project outward from the vertebral abutting surfaces 111 and engage with the vertebrae Ver on both sides of the clearance CL. In this embodiment, no auxiliary bone screws are implanted in the vertebrae Ver on either side; the intervertebral fusion device 10 thereby achieves a positioning function between the vertebrae Ver without the assistance of auxiliary bone screws, thus simplifying the surgical procedure, reducing the number of instruments used, and shortening the surgical duration.

With reference to FIG. 5, in one embodiment, the plurality of gripping teeth 122a on the expansion arms 122 engage the inner sides of the vertebrae Ver (i.e., the sides of the vertebrae Ver facing the intervertebral fusion device 10) to secure the intervertebral fusion device 10 between the vertebrae Ver, thereby preventing any relative movement or rotation between the intervertebral fusion device 10 and the vertebrae Ver. On each side, the plurality of gripping teeth 122a provide at least two engagement points on the vertebrae Ver, thereby preventing any single gripping tooth 122a from forming a rotational fulcrum which could cause the intervertebral fusion device 10 to rotate between the vertebrae Ver. The design of the tips of the gripping teeth 122a may vary as needed, such as various protruding designs including triangular or conical shapes.

Figure 4A:
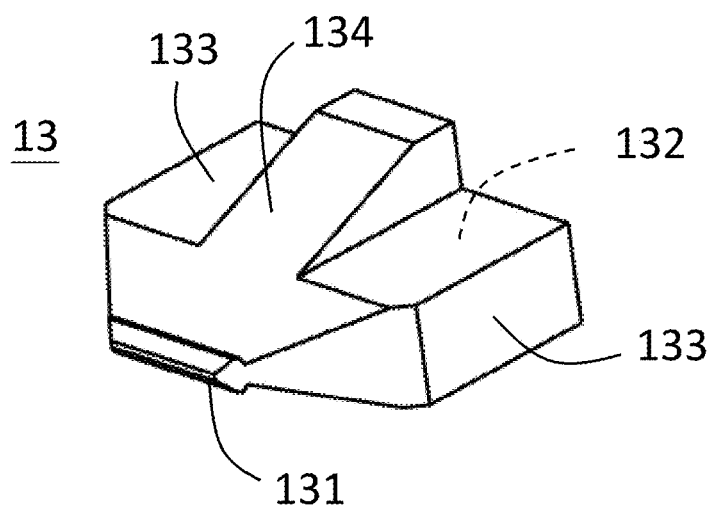
FIGS. 4A and 4B are schematic diagrams of the sliding block according to one embodiment of the present invention.
Figure 4B:
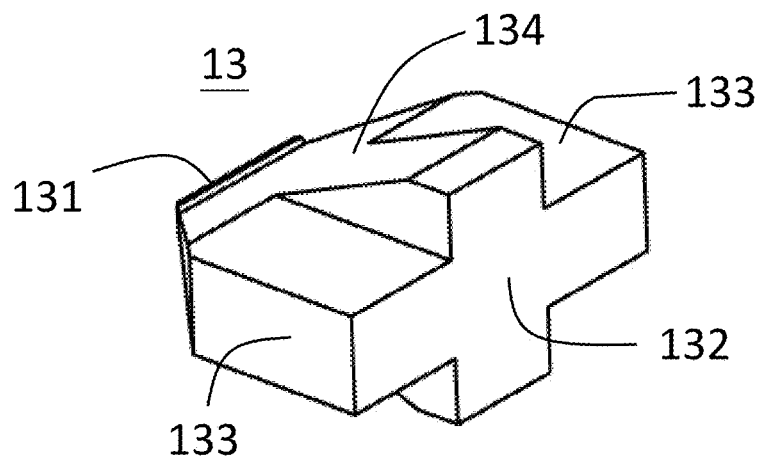

With reference to FIGS. 4A and 4B, in one embodiment, the sliding block 13 is provided with two positioning points corresponding to the snap-lock 122b, for example, a projection portion 131 and a stop surface 132 on the sliding block 13, which respectively define the closed state (FIG. 1B) and the expanded state (FIG. 5) of the expansion arms 122. It should be noted that the insertion depth of the sliding block 13 into the positioning hook 12 in the expanded state (FIG. 5) is greater than that in the closed state (FIG. 1B). Furthermore, the sliding block 13 includes lateral wing portions 133 extending laterally, which limit the sliding block 13 in a sliding manner within the slide rail 113. The snap-lock 122b alternately engages with the projection portion 131 and the stop surface 132, thereby controlling the switching of the expansion arms 122 between the closed state and the expanded state.

In one embodiment, in the closed state, the gripping teeth 122a on the expansion arms 122 are accommodated within the accommodation groove 112. In the closed state, the gripping teeth 122a may be completely or substantially completely accommodated within the accommodation groove 112. Thus, the overall dimensions of the intervertebral fusion device 10 are reduced, which is advantageous for transportation and related applications.

With reference to FIG. 5, in one embodiment, the slide rail 113 is in communication with the accommodation groove 112. The slide rail 113 and the accommodation groove 112, together with the portion of the sliding block 13 outside the positioning hook 12, define a continuous space CS. During vertebral fusion surgery, this continuous space CS may be filled with a bone substitute material, which functions to rapidly facilitate the formation of new bone. The bone substitute material, together with the intervertebral fusion device 10, facilitates fusion between the two vertebrae Ver, resulting in the formation of an integrated new bone body. The intervertebral fusion device 10 thereby determines the intervertebral clearance CL and maintains the stability of the intervertebral space.

In one embodiment, the two vertebrae Ver are lumbar, thoracic, cervical, or adjacent lumbar, thoracic, or cervical vertebrae. The intervertebral fusion device 10 may be applied regardless of the type of vertebrae involved.

Depending on age, gender, health status, and other factors, the clearance CL between two vertebrae Ver may vary in size. In one embodiment, the thickness of the intervertebral fusion device 10 provided by the present invention is not limited to a single thickness; rather, various thicknesses may be provided according to the different intervertebral clearance CL sizes to achieve the purpose of fusing the two vertebrae Ver.

In one embodiment, the main body 11 is fabricated from a polymeric material and the positioning hook 12 is fabricated from a metallic material. The polymeric material may be selected to have a Young's modulus close to that of the vertebrae Ver to avoid stress shielding. Both the polymeric and metallic materials are required to be of medical grade, meaning they can be readily disinfected, sterilized, and are stable during medical procedures without adversely affecting the user's health. The polymeric material may be polyetheretherketone (PEEK) and the metallic material may be titanium or a titanium alloy. This combination of polymeric and metallic materials thus provides both the desired medical effect and material stability.

In one embodiment, at least one intervertebral fusion device 10 may be arranged within the intervertebral clearance CL to enhance the balance and stability of the maintained intervertebral space. For instance, one or two intervertebral fusion devices 10 may be arranged within the clearance CL between two vertebrae Ver as needed. Alternatively, other quantities of intervertebral fusion devices 10 may be arranged within the clearance CL.

With reference to FIGS. 4A and 4B, in one embodiment, the sliding block 13 further comprises a guide inclined plane 134, along which the snap-lock 122b may slide in a controlled manner between the two positioning points (the projection portion 131 and the stop surface 132).

In one embodiment, the fixed portion 121 is connected to the main body 11 via a plurality of rods 14 having a snap-lock positioning function, which are inserted through holes 114 in the main body 11. The rods 14 may secure the positioning hook 12 to the main body 11 by means of a protruding portion (extending into the gap between the main body 11 and the positioning hook 12), by being riveted to the exterior of the main body 11, or by other barbed engagement methods.

The present invention has been described in considerable detail with reference to certain preferred embodiments thereof. It should be understood that the description is for illustrative purpose, not for limiting the scope of the application of the present invention. An embodiment or a claim of the present invention does not need to be regarded as having to achieve all the objectives or advantages of the present invention. Those skilled in this art can readily conceive variations and modifications within the spirit of the disclosure in this specification, which should therefore be included in the scope of the following claims. For example, the design of the gripping teeth and the shape of the expansion arm structure may be determined by the user as needed, and are not limited to the embodiments disclosed in the specification or illustrated in the figures. As another example, the shape of the expandable plates can be modified. In view of the foregoing, the spirit of the present invention should cover all such and other modifications and variations, which should be interpreted to fall within the scope of the following claims and their equivalents.

What is claimed is:

1. An intervertebral fusion device for maintaining a clearance between two vertebrae, the intervertebral fusion device comprising:
   a main body having two vertebral abutting surfaces on opposite sides and an accommodation groove and a slide rail disposed between the two vertebral abutting surfaces;
   a positioning hook disposed in the accommodation groove, the positioning hook comprising a fixed portion and an expansion arm connected to the fixed portion, the fixed portion being connected to the main body, wherein an outer side of the expansion arm is provided with a plurality of gripping teeth; and
   a sliding block, slidably disposed in the slide rail, to maintain the expansion arm in either a closed state or an expanded state of the positioning hook.

2. The intervertebral fusion device of claim 1, wherein the positioning hook includes two expansion arms respectively connected to two opposite sides of the fixed portion, wherein the outer side of each expansion arm is provided with the plurality of gripping teeth.

3. The intervertebral fusion device of claim 2, wherein an inner side of each expansion arm is provided with a snap-lock, and wherein the sliding block includes two positioning points corresponding to the snap-locks, respectively defining the closed state and the expanded state of the expansion arms.

4. The intervertebral fusion device of claim 2, wherein, in the expanded state the gripping teeth on the expansion arms engage with the vertebrae on both sides of the clearance, and no auxiliary bone screws are implanted in the vertebrae on both sides, the intervertebral fusion device thereby achieving a positioning function without auxiliary bone screw implantation.

5. The intervertebral fusion device of claim 1, wherein in the closed state the gripping teeth are accommodated within the accommodation groove.

6. The intervertebral fusion device of claim 2, wherein the slide rail is in communication with the accommodation groove, and a continuous space is defined by the slide rail, the accommodation groove, and a region of the sliding block external to the positioning hook, the continuous space being adapted for receiving a bone substitute material during vertebral fusion surgery to assist in the fusion of the two vertebrae with the intervertebral fusion device.

7. The intervertebral fusion device of claim 6, wherein after fusion the two vertebrae and the intervertebral fusion device are integrated to form a composite new bone body.

8. The intervertebral fusion device of claim 1, wherein the two vertebrae are lumbar, thoracic, or cervical vertebrae, and the main body is provided in multiple thicknesses corresponding to various intervertebral clearances.

9. The intervertebral fusion device of claim 1, wherein the main body is fabricated from a polymeric material and the positioning hook is fabricated from a metallic material.

10. The intervertebral fusion device of claim 9, wherein the main body is fabricated from polyetheretherketone (PEEK) and the positioning hook is fabricated from titanium or a titanium alloy.

11. The intervertebral fusion device of claim 2, wherein the plurality of gripping teeth on the expansion arms are configured to engage the vertebrae to prevent relative movement or rotation of the intervertebral fusion device between the vertebrae.

12. The intervertebral fusion device of claim 1, wherein at least one intervertebral fusion device is arranged within the intervertebral clearance.

13. The intervertebral fusion device of claim 2, wherein the sliding block further comprises a guide inclined plane for guiding the snap-lock to slide between the two positioning points.

14. The intervertebral fusion device of claim 2, wherein the fixed portion is connected to the main body by means of rods having a snap-lock positioning function.

* * * * *